(12) United States Patent
Liu et al.

(10) Patent No.: US 11,454,860 B2
(45) Date of Patent: Sep. 27, 2022

(54) LIQUID CRYSTAL PHASE SHIFTER AND MANUFACTURING METHOD THEREOF

(71) Applicant: TRUWIN OPTO-ELECTRONICS LIMITED, Guang Dong (CN)

(72) Inventors: Zhisheng Liu, Guangdong (CN); Xiangzhan Xu, Guangdong (CN); Zhiling Wang, Guangdong (CN); Taitian Lyu, Guangdong (CN); Lixiong Wang, Guangdong (CN); Zhuoqian Lu, Guangdong (CN); Jiqiang He, Guangdong (CN)

(73) Assignee: TRUWIN OPTO-ELECTRONICS LIMITED, Guang Dong (CN)

( * ) Notice: Subject to any disclaimer, the term of this patent is extended or adjusted under 35 U.S.C. 154(b) by 235 days.

(21) Appl. No.: 16/770,620

(22) PCT Filed: Mar. 14, 2019

(86) PCT No.: PCT/CN2019/078173
§ 371 (c)(1),
(2) Date: Jun. 8, 2020

(87) PCT Pub. No.: WO2020/181557
PCT Pub. Date: Sep. 17, 2020

(65) Prior Publication Data
US 2021/0208472 A1 Jul. 8, 2021

(30) Foreign Application Priority Data
Mar. 12, 2019 (CN) .......................... 201910185805.0

(51) Int. Cl.
*G02F 1/1339* (2006.01)
*G02F 1/35* (2006.01)
*H01P 1/18* (2006.01)

(52) U.S. Cl.
CPC .......... *G02F 1/3544* (2013.01); *G02F 1/1339* (2013.01); *H01P 1/18* (2013.01)

(58) Field of Classification Search
CPC .................................................... G02F 1/1339
See application file for complete search history.

(56) References Cited

U.S. PATENT DOCUMENTS

| 7,492,439 B1 | 2/2009 | Marshall |
| 2020/0073179 A1 * | 3/2020 | Pan ........................ G02F 1/1337 |

FOREIGN PATENT DOCUMENTS

| CN | 108803096 | 11/2018 |
| TW | 201428231 | 7/2014 |

(Continued)

OTHER PUBLICATIONS

"International Search Report (Form PCT/ISA/210) of PCT/CN2019/078173," dated Dec. 19, 2019, pp. 1-5.

*Primary Examiner* — Edmond C Lau
(74) *Attorney, Agent, or Firm* — JCIP Global Inc.

(57) ABSTRACT

The present disclosure provides a liquid crystal phase shifter, comprising a first substrate and a second substrate which are oppositely arranged, and a liquid crystal layer positioned between the first substrate and the second substrate, wherein a plurality of spacers are distributed in the liquid crystal layer, the spacers are in contact with the first substrate and the second substrate, and include a first spacer arranged on the first substrate and a second spacer arranged on the second substrate, and the first spacer and the second spacer are abutted. The present disclosure also provides a manufacturing method of the liquid crystal phase shifter.

9 Claims, 2 Drawing Sheets

(56) References Cited

FOREIGN PATENT DOCUMENTS

WO        2018066459        4/2018
WO    WO-2018066459 A1 *   4/2018   ............. C09K 19/04

* cited by examiner

LIQUID CRYSTAL PHASE SHIFTER AND MANUFACTURING METHOD THEREOF

CROSS-REFERENCE TO RELATED APPLICATION

This application is a 371 of international application of PCT application serial no. PCT/CN2019/078173, filed on Mar. 14, 2019, which claims the priority benefit of China application no. 201910185805.0, filed on Mar. 12, 2019. The entirety of each of the above mentioned patent applications is hereby incorporated by reference herein and made a part of this specification.

BACKGROUND

Technical Field

The present disclosure relates to the technical field of phase shifting, in particular to a liquid crystal phase shifter and a manufacturing method thereof.

Description of Related Art

A phase shifter is a device which can adjust the phases of electromagnetic waves, and is widely used in radar, communication, instruments and other fields. A liquid crystal phase shifter has advantages in continuous phase modulation. It is known that the relationship between liquid crystal dielectric loss and liquid crystal cell thickness of the liquid crystal phase shifter is as follows: the larger the cell thickness, the smaller the effective dielectric constant, and the smaller the dielectric loss. In order to reduce dielectric loss, at current, the thickness of a liquid crystal layer of the liquid crystal phase shifter is 100-250 µm, which is dozens to hundreds of times that of a traditional liquid crystal display panel. A thicker support (commonly referred to a spacer) is required when a liquid crystal phase shifter with a thick cell is manufactured.

In the prior art, a plastic ball (spacer) or a photoresist (photospacer) can be arranged on one of substrates and a sealant can be made on another substrate by screen printing. For example, by virtue of a spraying method, when being ejected from a nozzle of a spray head, powder liquid is dispersed in a machine cavity by means of compressed gas on two sides, so that the plastic ball (spacer) falls on the substrate by sedimentation, and the density of the plastic ball is adjusted by the retention time of the substrate in the machine cavity. According to a liquid crystal panel process, a 12 µm plastic ball can be sprayed uniformly, but a 30 µm plastic ball cannot be sprayed uniformly, the plastic ball density is low, and therefore a uniform cell thickness is not available. Moreover, a plastic ball with a thickness of 100 µm or above can hardly be sprayed.

The substrate is coated with the photoresist (photospacer) through a spin-coating process, UV light is used for irradiation reaction after passing through a specially designed mask plate, and the undesired photoresist in an area is removed through development, thus obtaining a support with a pre-designed pattern at a designated position. As the spin-coating process only adopts the photoresist with low viscosity for coating, only a film can be obtained, resulting in obtaining a support with small thickness. The liquid crystal panel process can only produce a 6-15 µm photospacer, but it is still far from meeting the thickness requirement of 100 µm or above.

Even if the sealant has a large supporting area, utilizes glue with higher viscosity in the screen printing process, and can make the thickness be 100 µm or above, the cell thickness of a liquid crystal phase shifter, made by the sealant with great effort, can reach 100-250 µm, but still cannot avoid the following problems: in a conventional manufacturing method, the thickness of a spacer in the middle of a cell, such as a plastic ball (spacer) and a photoresist (photospacer), cannot reach 100 µm, and therefore, when an area, away from the sealant, of a liquid crystal layer deforms, the thickness of the liquid crystal phase shifter also changes, resulting in poor performance of the liquid crystal phase shifter.

SUMMARY

In order to solve the above problems, the present disclosure provides a liquid crystal phase shifter with a thick cell and a manufacturing method thereof.

The present disclosure provides a liquid crystal phase shifter, comprising a first substrate and a second substrate which are oppositely arranged, and a liquid crystal layer positioned between the first substrate and the second substrate, wherein a plurality of spacers are distributed in the liquid crystal layer, the spacers are in contact with the first substrate and the second substrate, and include a first spacer arranged on the first substrate and a second spacer arranged on the second substrate, and the first spacer and the second spacer are abutted.

Preferably, the position of the first spacer corresponds to the position of the second spacer.

Sealants in the liquid crystal phase shifter are further arranged between the first substrate and the second substrate, and the first substrate, the second substrate and the sealants form a housing.

Preferably, the sealants include a first sealant arranged on the first substrate and a second sealant arranged on the second substrate, the first sealant and the second sealant are abutted, and the position of the first sealant corresponds to the position of the second sealant.

Preferably, the spacers are epoxy glue or UV glue.

Preferably, the sealants are epoxy glue or UV glue.

Preferably, the thickness of the liquid crystal layer is not less than 100 µm.

Further, the thickness of the liquid crystal layer is 100-250 µm.

A first electrode in the liquid crystal phase shifter is arranged on an inner side of the first substrate and a second electrode in the liquid crystal phase shifter is arranged on an inner side of the second substrate.

Further, the liquid crystal phase shifter further comprises a first alignment layer and a second alignment layer arranged on two sides of the liquid crystal layer respectively.

The present disclosure also provides a manufacturing method of the liquid crystal phase shifter, used for manufacturing the liquid crystal phase shifter as described above, and the manufacturing method comprises the following steps:

preparing a first spacer on a first substrate;
preparing a second spacer on a second substrate; and
oppositely bonding the first substrate and the second substrate to form a housing, and filling the housing with a liquid crystal layer.

Preferably, the first spacer and the second spacer are formed on the substrates by screen printing.

Preferably, the manufacturing method further comprises: preparing sealants on the first substrate and/or the second substrate before oppositely bonding.

Preferably, a first sealant is prepared on the first substrate, and a second sealant is prepared on the second substrate;

the first spacer is prepared while the first sealant is prepared, and glue is subjected to transfer printing to be onto the first substrate by using a pre-fabricated screen printing tool with patterns of the first sealant and the first spacer; and the second spacer is prepared while the second sealant is prepared, and glue is subjected to transfer printing to be onto the second substrate by using a pre-fabricated screen printing tool with patterns of the second sealant and the second spacer.

Preferably, a method for oppositely bonding the two substrates to form the housing is as follows:

oppositely bonding: the first substrate and the second substrate are then oppositely bonded; and hot-press curing: hot-press curing is carried out on the two substrates which are oppositely bonded by using a hot-press device, so as to form a housing with a predetermined thickness.

Preferably, after the first substrate and the second substrate are oppositely bonded, the relative positions of the first substrate and the second substrate are fixed, and then hot-press curing is performed.

Preferably, before oppositely bonding, the glue is preliminarily cured by performing pre-curing.

Compared with the prior art, the present disclosure has the following beneficial effects:

the first spacer and the second spacer are arranged on the first substrate and the second substrate respectively, so that the thickness of a support of the liquid crystal phase shifter being 100 μm or above is realized, and the performance of the liquid crystal phase shifter is ensured. Besides, the liquid crystal phase shifter is easy to manufacture, and the liquid crystal phase shifter with the thick cell can be manufactured on a large scale.

DESCRIPTION OF REFERENCE NUMERALS

11—first substrate, 12—second substrate, 21—first electrode, 22—second electrode, 31—first sealant, 32—second sealant, 41—first spacer, 42—second spacer, 50—liquid crystal layer.

DESCRIPTION OF THE EMBODIMENTS

In order to make the objective, technical solution and advantages of the present disclosure clearer, the present disclosure will be further described in detail below with reference to the accompanying drawings. Obviously, the described embodiments are only a part of the embodiments of the present disclosure, not all of the embodiments. Based on the embodiments of the present disclosure, all other embodiments obtained by those of ordinary skill in the art without creative labor fall within the scope of the present disclosure.

A liquid crystal phase shifter and a manufacturing method thereof provided by the present disclosure will be further described below with reference to the accompanying drawings and embodiments.

Embodiment 1

Figure 1:
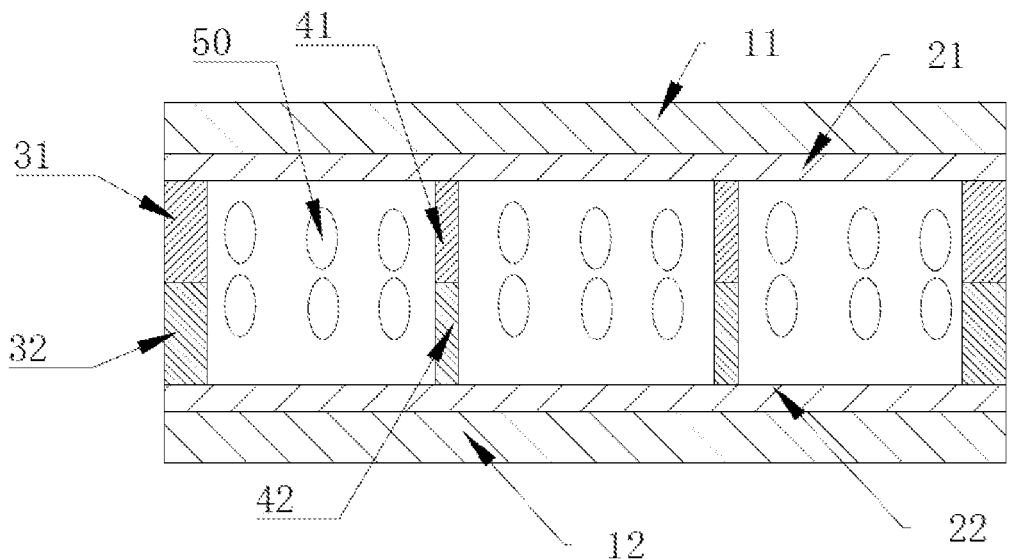
FIG. 1 is a structural schematic diagram of a liquid crystal phase shifter provided by an embodiment of the present disclosure.

As shown in FIG. 1, a specific embodiment provides a liquid crystal phase shifter. The liquid crystal phase shifter comprises a first substrate 11 and a second substrate 12 which are oppositely arranged, and a liquid crystal layer 50 positioned between the first substrate 11 and the second substrate 12. A plurality of spacers are distributed in the liquid crystal layer 50, the spacers are in contact with the first substrate 11 and the second substrate 12, and the spacers serve as supports for the first substrate 11 and the second substrate 12.

Materials with good stability and insulation effect as well as extremely low dielectric loss are selected for the first substrate 11 and the second substrate 12, and rigid substrates or flexible substrates can be adopted. For example, the rigid substrate may be a glass substrate or a PET substrate, or made of a glass material, molten quartz, a ceramic material, PET, or the like, but is preferably the glass substrate.

The spacers include a first spacer 41 arranged on the first substrate 11 and a second spacer 42 arranged on the second substrate 12. The first spacer 41 and the second spacer 42 are abutted. The total thickness of the spacers are the sum of the thickness of the first spacer 41 and the thickness of the second spacer 42.

In the prior art, the spacers are individual plastic balls scattered on the substrates by spraying, the spacers are uniformly distributed on the first substrate 11 or the second substrate 12, or a photoresist (photospacer) is used to prepare supports meeting specific requirements through a yellow-light process, and a sealant is made on another substrate through screen printing. The largest thickness of the spacers produced by spraying plastic balls (spacer) is 30 μm, the height of the supports produced by the photospacer can only be about 15 μm, and therefore, spacer support points with sufficient thicknesses cannot be produced.

In the present application, the first spacer 41 and the second spacer 42 are arranged on the first substrate 11 and the second substrate 12 respectively, so that the thickness of the spacer support points can be sufficient. Therefore, a solution is provided for a liquid crystal phase shifter with a thick cell and ensures the performance of the liquid crystal phase shifter.

Preferably, the position of the first spacer 41 corresponds to the position of the second spacer 42.

Spacers are formed on the substrates by screen printing. The spacers are epoxy glue or UV glue. Preferably, the spacers are epoxy glue.

It can be understood that in the present embodiment, sealants are also arranged between the first substrate 11 and the second substrate 12. The sealants are located at edges of the first substrate 11 and the second substrate 12. The first substrate 11, the second substrate 12 and the sealants form a housing which is also called a liquid crystal cell. The sealant is provided with an opening through which a liquid crystal material enters the housing.

In order to ensure the consistency of the cell thickness of the liquid crystal phase shifter, the thicknesses of the spacers are equal to the thicknesses of the sealants.

Preferably, the sealants include a first sealant 31 arranged on the first substrate 11 and a second sealant 32 arranged on the second substrate 12. The first sealant 31 and the second sealant 32 are abutted. The total thickness of the sealants is the sum of the thickness of the first sealant 31 and the thickness of the second sealant 32. The position of the first sealant 31 corresponds to the position of the second sealant 32.

The sealants can also be formed on the substrates by screen printing. The sealants can be epoxy glue or UV glue. Preferably, the sealants are epoxy glue.

The liquid crystal phase shifter provided by the present embodiment has a thick cell, and the thickness of the liquid crystal layer 50 is not less than 100 µm. More preferably, the thickness of a liquid crystal layer 50 is 100-250 µm.

The liquid crystal phase shifter further comprises a first electrode 21 formed on an inner side of the first substrate 11 and a second electrode 22 formed on an inner side of the second substrate 12. The first electrode 21 and the second electrode 22 are made of metal materials with high conductivity and magnetic permeability, and may be made of metals such as aluminum, copper, silver, gold, cadmium, chromium, molybdenum, niobium, nickel, iron, etc.

The liquid crystal phase shifter further comprises a first alignment layer and a second alignment layer (not shown in figures) arranged on two sides of the liquid crystal layer 50 respectively. The first alignment layer is prepared on the first substrate 11 where a first conductive layer is formed, and the second alignment layer is prepared on the second substrate 12 where a second conductive layer is formed. The alignment layers are used to define initial deflection angles of liquid crystal molecules of the liquid crystal layer 50.

By applying voltage between the first electrode 21 and the second electrode 22, a dielectric constant of liquid crystal can be changed. In a specific embodiment, the first electrode 21 comprises a grounding electrode, and the second electrode 22 comprises a planar transmission line for transmitting microwave signals. The planar transmission line is preferably a microstrip line. The shape of the microstrip line can be S-shaped or spiral, which is not limited, as along as the transmission of the microwave signals can be realized.

When no electric field is applied between the microstrip line and the grounding electrode, the liquid crystal molecules are arranged in a preset direction under the action of the first alignment layer and the second alignment layer.

When an electric field is applied between the microstrip line and the grounding electrode, the electric field drives deflection of the liquid crystal molecules in the liquid crystal layer 50. By controlling the voltage on the microstrip line and the grounding electrode, the deflection angle of liquid crystal in the liquid crystal layer 50 can be controlled, and further the phase adjusted in a phase shifting process can be controlled.

Embodiment 2

A specific embodiment provides a manufacturing method of the liquid crystal phase shifter according to Embodiment 1. The manufacturing method of the liquid crystal phase shifter comprises the following steps:

Step S1: preparing a first spacer 41 on a first substrate 11;

Step S2: preparing a second spacer 42 on a second substrate 12;

Step S3: oppositely bonding the first substrate 11 and the second substrate 12 to form a housing;

Step S4: filling the housing with a liquid crystal layer 50; and

Step S5: after filling by the liquid crystal layer 50, sealing sealant openings of the housing.

It should be noted that the sequence of step S1 and step S2 can be adjusted. The spacers can be formed on the substrates by screen printing.

In the above step S3, "oppositely bonding" may also be referred to as "assembling".

Specifically, glue can be subjected to transfer printing to be onto the corresponding substrate by using a pre-fabricated screen printing tool with spacer patterns. The glue is, for example, epoxy glue or UV glue, preferably epoxy glue. By the method, the liquid crystal phase shifter with the thick cell having supports being more than 100 µm can be easily manufactured, and the liquid crystal phase shifters with the thick cell can be manufactured in batch.

The first spacer 41 and the second spacer 42 are arranged on the first substrate 11 and the second substrate 12 respectively, so that the liquid crystal phase shifter may have a support being 100 µm or above in thickness, and the performance of the liquid crystal phase shifter is ensured. Besides, the liquid crystal phase shifter is easy to manufacture through the process, and the liquid crystal phase shifters with the thick cell can be manufactured on a large scale.

Figure 3:
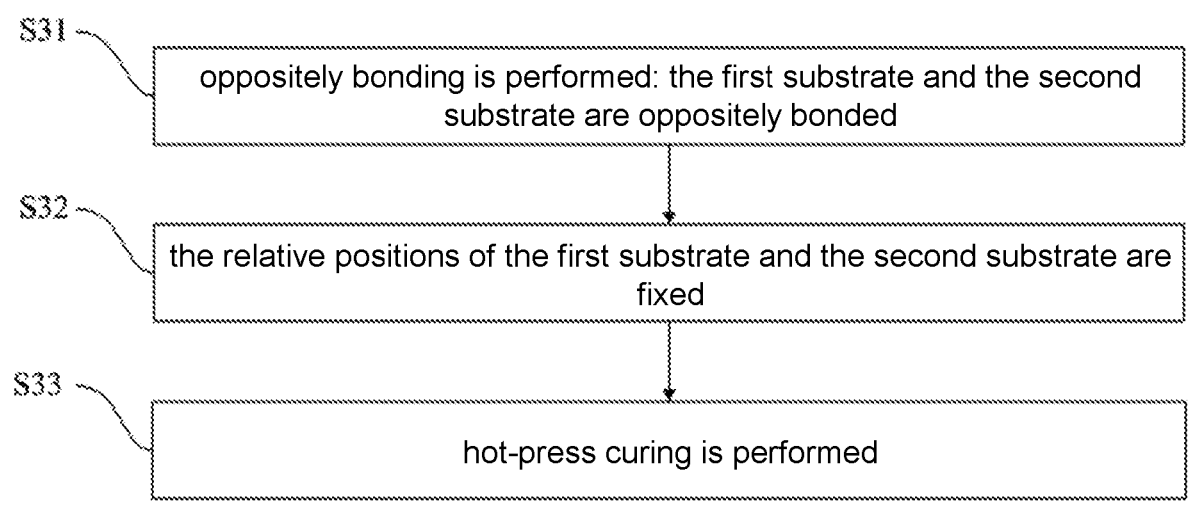
FIG. 3 is a flowchart of a manufacturing method for oppositely bonding to form a housing of a liquid crystal phase shifter provided by an embodiment of the present disclosure.

As shown in FIG. 3, a method for oppositely bonding the two substrates to form the housing in step S3 is as follows:

Step S31: oppositely bonding is performed: the first substrate 11 and the second substrate 12 are oppositely bonded;

Step S32: the relative positions of the first substrate 11 and the second substrate 12 are fixed; and Step S33: hot-press curing is performed: hot-press curing is carried out on the two substrates which are oppositely bonded by using a hot-press device, so as to form the housing with a predetermined thickness.

The specific method for oppositely bonding is as follows: when patterns of the first electrode 21 and the second electrode 22 are made, corresponding alignment marks are set on the first substrate 11 and the second substrate 12. For example, the alignment mark for the first substrate 11 is ○ and the alignment mark for the second substrate 12 is ●. During alignment, the first substrate 11 and the second substrate 12 can be precisely aligned by CCD oppositely registration. In precise alignment, the corresponding contact surfaces of the first spacer 41 and the second spacer 42 overlap. Alignment deviation may cause incomplete overlapping of the corresponding contact surfaces of the first spacer 41 and the second spacer 42, making the strength and supporting performance of the supports poorer. After alignment, the first substrate 11 and the second substrate 12 are bonded, that is, bonding equipment moves slowly till the sealants and the spacers on the two layers of the first substrate 11 and the second substrate 12 are connected.

Prior to oppositely bonding in step S31, preferably, pre-curing is performed to preliminarily cure the glue of the first spacer 41 and the second spacer 42, so as to prevent the massive flow of the glue during the oppositely bonding and to ensure easy subsequent curing of the glue.

A specific method for fixing the relative positions of the first substrate 11 and the second substrate 12 is as follows: UV glue is applied on peripheral points of the edges of substrates, and the UV glue is fixed first by UV irradiation, so that the first substrate 11 and the second substrate 12 do not move easily.

Hot-press curing is generally carried out under process condition of high pressure and high temperature. Certain pressure is applied to firmly bond the first spacer 41 and the second spacer 42 while curing is performed. After sufficient curing, the first spacer 41 and the second spacer 42 are firmly bonded to form a housing with empty liquid crystal cell with high bonding strength, high mechanical strength and thicker supports.

Step S32 is a preferred solution, which can be omitted in the method for oppositely bonding the two substrates to form the housing, but the implementation effect will be slightly poor without this step.

Before oppositely bonding, a sealant is made on the first substrate 11 and/or the second substrate 12.

The sealant can be made on one of the substrates, and the sealant forms an accommodating space between the first substrate 11 and the second substrate 12 to contain liquid crystal. The sealant is provided with an opening which may be filled with liquid crystal.

More preferably, the first substrate 11 and the second substrate 12 are both provided with sealants, and a method for manufacturing the sealants is as follows:

preparing a first sealant 31 on the first substrate 11, and a second sealant 32 on the second substrate 12, wherein the first sealant 31 and the second sealant 32 are firmly bonded together during hot-press curing.

The sealants and the spacers can be prepared separately, but preferably, the first spacer 41 is prepared while the first sealant 31 is prepared, and the second spacer 42 is prepared while the second sealant 32 is prepared. The spacers and the sealants are formed on the substrates by screen printing.

The glue is subjected to transfer printing to be onto the first substrate 11 by using a pre-fabricated screen printing tool with patterns of the first sealant 31 and the first spacer 41; and the glue is subjected to transfer printing to be onto the second substrate 12 by using a pre-fabricated screen printing tool with patterns of the second sealant 32 and the second spacer 42. Through the extrusion of a scraper, the printing glue is subjected to transfer printing to be onto the substrates through meshes of the screen printing tool to form the sealants and the spacers with required shapes and positions. The glue used for screen printing is epoxy glue or UV glue, preferably epoxy glue, and thick-cell liquid crystal phase shifters can be produced in batch through a process of screen printing of epoxy glue supports on both sides. Meanwhile, through simultaneous preparation, the efficiency of the process is improved, and the situation that screen printing is conducted on one substrate twice to produce different patterns, a screen-printed pattern obtained in first screen printing may be damaged by secondary screen printing is avoided.

Figure 2:
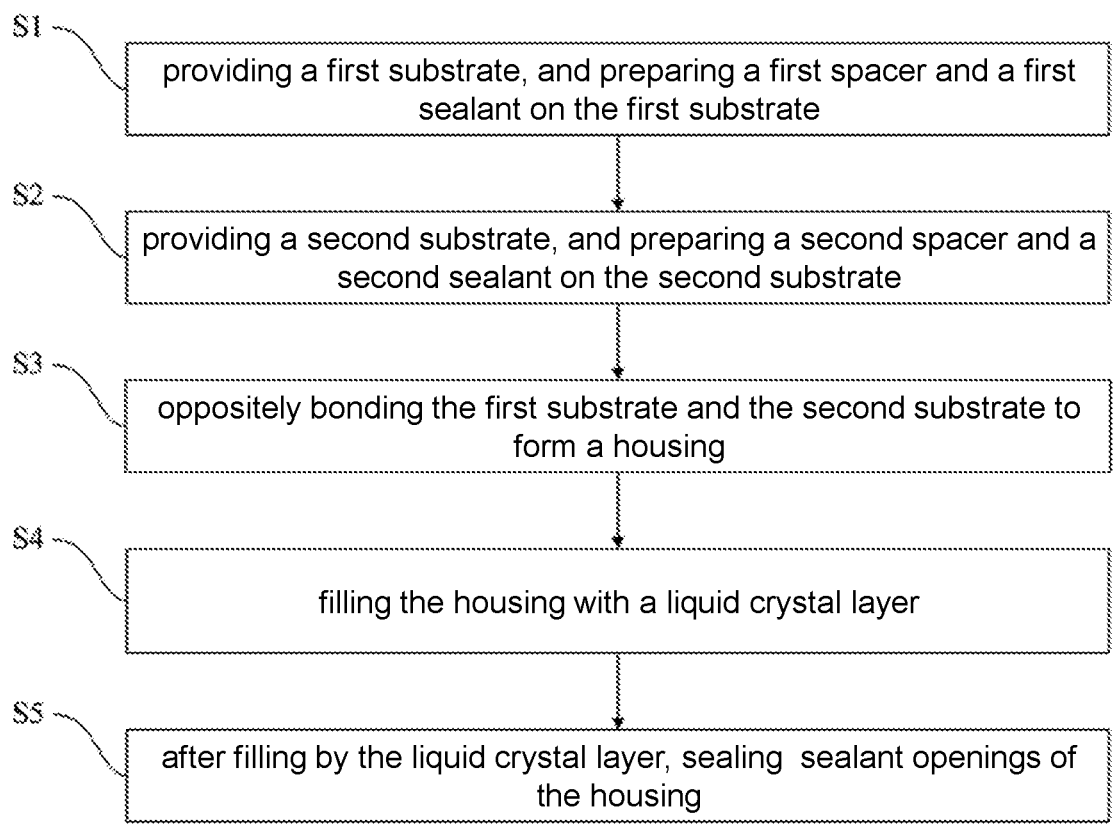
FIG. 2 is a flowchart of a manufacturing method of a liquid crystal phase shifter provided by an embodiment of the present disclosure.

In a specific embodiment, the manufacturing method of the liquid crystal phase shifter is shown in FIG. 2.

Through the above specific method for oppositely bonding, the alignment of the positions of the first spacer 41 and the second spacer 42 and the alignment of the positions of the first sealant 31 and the second sealant 32 can be ensured at the same time. It can be understood that the positions of the first spacer 41 and the second spacer 42 correspond to each other in a vertical direction during the oppositely bonding, and the first spacer 41 and the second spacer 42 can be abutted after the oppositely bonding. Similarly, during the oppositely bonding, the positions of the first sealant 31 and the second sealant 32 correspond to each other in the vertical direction, and after the oppositely bonding, the first sealant 31 and the second sealant 32 can be abutted.

When the housing of the liquid crystal phase shifter is manufactured, a large substrate is generally adopted, and after step S3 is completed, a plurality of housings are obtained. After that, single-grain cutting is performed to obtain a housing with single-grain liquid crystal phase shifter cell.

A method for filling liquid crystal can be as follows: at the opening, the required liquid crystal material is sucked into the housing through a vacuum capillary effect.

After the liquid crystal cell is filled with the liquid crystal layer 50, the opening of a housing of the liquid crystal cell is sealed, the opening through which liquid crystal is filled is coated with UV glue, and then irradiated with UV light, so that the mechanical strength of the liquid crystal cell can be enhanced, and the liquid crystal cell has better sealing performance.

An inner side of the first substrate 11 is provided with a first electrode 21, and an inner side of the second substrate 12 is provided with a second electrode 22. The first electrode 21 and the second electrode 22 can be obtained by forming conductive layers on the corresponding substrates and then patterning the conductive layers.

The conductive layers can be obtained by existing sputtering or thermal evaporation methods. The conductive layers can be made of metals such as aluminum, copper, silver, gold, cadmium, chromium, molybdenum, niobium, nickel, iron, etc, or transparent conductive oxides such as ITO, IGZO, AZO, etc.

The patterning process is known to those skilled in the art and can be realized by the process of glue coating, pre-curing, exposure, development, etching and stripping.

Before preparing the sealants and the spacers on the substrates, the method further comprises the following steps:

forming a first alignment layer on the first substrate 11 on which the first conductive layer is formed, and a second alignment layer on the second substrate 12 on which the second conductive layer is formed.

The alignment layers can be made by a PI friction process in the prior art so as to form directional grooves in surfaces. An APR plate can be used to enable pre-dripped directional liquid to be onto the corresponding substrates with electrode patterns through transfer print transfer printing, and high-temperature baking is conducted to allow sufficient reaction and volatilize a solvent, so as to finally form a solid directional film layer. The directional film is polished in one direction with flannel or cotton cloth to arrange the liquid crystal molecules in parallel according to a preset friction direction, which will not be described in detail herein.

Finally, it should be noted that the above embodiments are only used to illustrate the technical solutions of the embodiments of the present disclosure and not to limit the present disclosure. Although the embodiments of the present disclosure have been described in detail with reference to the preferred embodiments, those of ordinary skill in the art should understand that the technical solutions of the embodiments of the present disclosure can still be modified or substituted equivalently, and these modifications or equivalent substitutions cannot make the modified technical solutions depart from the scope of the technical solutions of the embodiments of the present disclosure.

What is claimed is:

1. A liquid crystal phase shifter, comprising a first substrate and a second substrate which are oppositely arranged, and a liquid crystal layer positioned between the first substrate and the second substrate, wherein a plurality of spacers are distributed in the liquid crystal layer, the spacers are in contact with the first substrate and the second substrate, and include a first spacer arranged on the first substrate and a second spacer arranged on the second substrate, and the first spacer and the second spacer are abutted, wherein sealants are further arranged between the first substrate and the second substrate, and the first substrate, the second substrate and the sealants form a housing, the sealants include a first sealant arranged on the first substrate and a second sealant arranged on the second substrate, the first sealant and the second sealant are abutted, and the position of the first sealant corresponds to the position of the second sealant.

2. The liquid crystal phase shifter according to claim 1, wherein the position of the first spacer corresponds to the position of the second spacer.

3. The liquid crystal phase shifter according to claim 1, wherein a thickness of the liquid crystal layer is not less than 100 μm.

4. The liquid crystal phase shifter according to claim 1, wherein the thickness of the liquid crystal layer is 100-250 μm.

5. A manufacturing method of the liquid crystal phase shifter, used for manufacturing the liquid crystal phase shifter as claimed in claim 1, and the manufacturing method comprises the following steps:

preparing the first spacer on the first substrate;

preparing the second spacer on the second substrate; and oppositely bonding the first substrate and the second substrate to form a housing, and filling the housing with the liquid crystal layer, wherein the first spacer and the second spacer are formed on the first substrate and the second substrate by screen printing respectively, wherein the manufacturing method further comprises preparing the first sealant on the first substrate and preparing the second sealant on the second substrate before oppositely bonding the first substrate and the second substrate.

6. The manufacturing method of the liquid crystal phase shifter according to claim 5, wherein the first spacer is prepared while the first sealant is prepared, and glue is subjected to transfer printing to be onto the first substrate by using a pre-fabricated screen printing tool with patterns of the first sealant and the first spacer; and the second spacer is prepared while the second sealant is prepared, and glue is subjected to transfer printing to be onto the second substrate by using a pre-fabricated screen printing tool with patterns of the second sealant and the second spacer.

7. The manufacturing method of the liquid crystal phase shifter according to claim 6, wherein a method for oppositely bonding the first substrate and the second substrate s to form the housing is as follows:

oppositely bonding: the first substrate and the second substrate are then oppositely bonded; and hot-press curing: hot-press curing is carried out on the first substrate and the second substrate which are oppositely bonded by using a hot-press device, so as to form the housing with a predetermined thickness.

8. The manufacturing method of the liquid crystal phase shifter according to claim 7, wherein after the first substrate and the second substrate are oppositely bonded, the relative positions of the first substrate and the second substrate are fixed, and then hot-press curing is performed.

9. The manufacturing method of the liquid crystal phase shifter according to claim 7, wherein before oppositely bonding, the glue is preliminarily cured by performing pre-curing.

* * * * *